United States Patent [19]
Zerbe et al.

[11] Patent Number: 5,415,425
[45] Date of Patent: May 16, 1995

[54] APPARATUS FOR COUPLING A GOOSENECK HITCH TO A TRAILER PLATFORM

[75] Inventors: Randal L. Zerbe, Rockford; Thomas R. Brown, Oregon, both of Ill.

[73] Assignee: E.D. Etnyre & Co., Oregon, Ill.

[21] Appl. No.: 208,933

[22] Filed: Mar. 10, 1994

[51] Int. Cl.⁶ ............................................. B62D 53/06
[52] U.S. Cl. .............................. 280/441.2; 280/417.1; 280/425.2; 414/481
[58] Field of Search ................ 280/406.2, 416.3, 417.1, 280/423.1, 425.2, 441.2, 455, 493, 511, 512, 901; 414/481

[56] References Cited

U.S. PATENT DOCUMENTS 3,632,139 1/1972 Stafford, Jr. ..................... 280/441.2

OTHER PUBLICATIONS

4-Page Brochure entitled *Liddell-Birmingham M Series* publication date unknown).

*Primary Examiner*—Mitchell J. Hill
*Attorney, Agent, or Firm*—Leydig, Voit & Mayer, Ltd.

[57] ABSTRACT

A gooseneck hitch is held in coupled relation with a trailer platform by a pivoted link which is adapted to be rocked rearwardly by hydraulic actuators to raise the forward end of the platform to a transport position and rocked forwardly to lower the forward end of the platform to the ground and permit removal of the gooseneck from the platform. During towing of the trailer with the platform in a normal transport position, the actuators are hydraulically unloaded and the link is held against forward rocking by a pair of compression cams. The cams are manually released from the link during removal of the gooseneck but are automatically re-engaged with the link during re-installation of the gooseneck so as to relieve the trailer operator of the re-engagement task. The cams may be selectively adjusted to change the transport height of the forward end of the platform and/or to compensate for variations in the height of the fifth wheel coupler of the towing vehicle.

7 Claims, 5 Drawing Sheets

APPARATUS FOR COUPLING A GOOSENECK HITCH TO A TRAILER PLATFORM

BACKGROUND OF THE INVENTION

This invention relates generally to a trailer and, more particularly, to a trailer having a wheeled cargo-carrying platform which is adapted to be connected to a towing vehicle by a so-called gooseneck hitch. Such a hitch extends upwardly and forwardly from the forward end portion of the platform and is adapted to be connected to the fifth wheel coupler of the towing vehicle.

Typically, the forward end of the platform includes laterally spaced hooks which receive a laterally extending shaft on the gooseneck. A link is supported to pivot on the shaft and includes a foot which bears downwardly against the forward end portion of the platform. When the link is pivoted by hydraulic actuators in a direction loading the foot downwardly on the platform, a force couple is created and raises the shaft into tight engagement with the hooks to lift the forward end portion of the platform to a transport position. Upon reverse pivoting of the link, the force couple is relieved to permit the forward end portion of the platform to lower to the ground and to permit the gooseneck to be detached from the platform for purposes of facilitating loading and unloading of the platform.

In order to relieve pressure from the hydraulic actuators during normal towing of the platform, mechanical stop means are provided for preventing the link from pivoting in a direction relieving the force couple. The stop means usually are adjustable to enable adjustment of the platform ride height and/or to compensate for variations in the height of the fifth wheel coupler of the towing vehicle. The stop means must be moved to an inactive position to permit lowering of the platform and removal of the gooseneck and then must be returned to an active position during re-installation of the gooseneck.

In prior arrangements, the trailer operator not only must manually move the stop means to their inactive positions before lowering the platform and removing the gooseneck but must also manually restore the stop means to their active positions upon re-installing the gooseneck. If it is desired to establish the same ride height, the operator must make certain that the stop means are restored to the same position that they occupied prior to lowering of the platform. As a result, considerable manual effort is required in order to re-install the gooseneck.

SUMMARY OF THE INVENTION

The general aim of the present invention is to provide new and improved apparatus in which the stop means for the pivoted link are restored to an active position automatically as an incident to re-installing the gooseneck and, upon being so restored, are capable of establishing the same preselected ride height as existed previously.

A more detailed object of the invention is to achieve the foregoing by providing stop means which, during removal and re-installation of the gooseneck, are automatically shifted by the pivoting link in such a manner that the stop means become automatically restored to a preselected active position without any attention on the part of the trailer operator.

A further object is to provide stop means in the form of toothed cams which coact with teeth on the pivoted link to provide positive interlocking engagement between the link and the cams when the latter are in their active positions while enabling quick and easy adjustment of the ride height of the trailer platform.

These and other objects and advantages of the invention will become more apparent from the following detailed description when taken in conjunction with the accompanying drawings.

Figure 1:
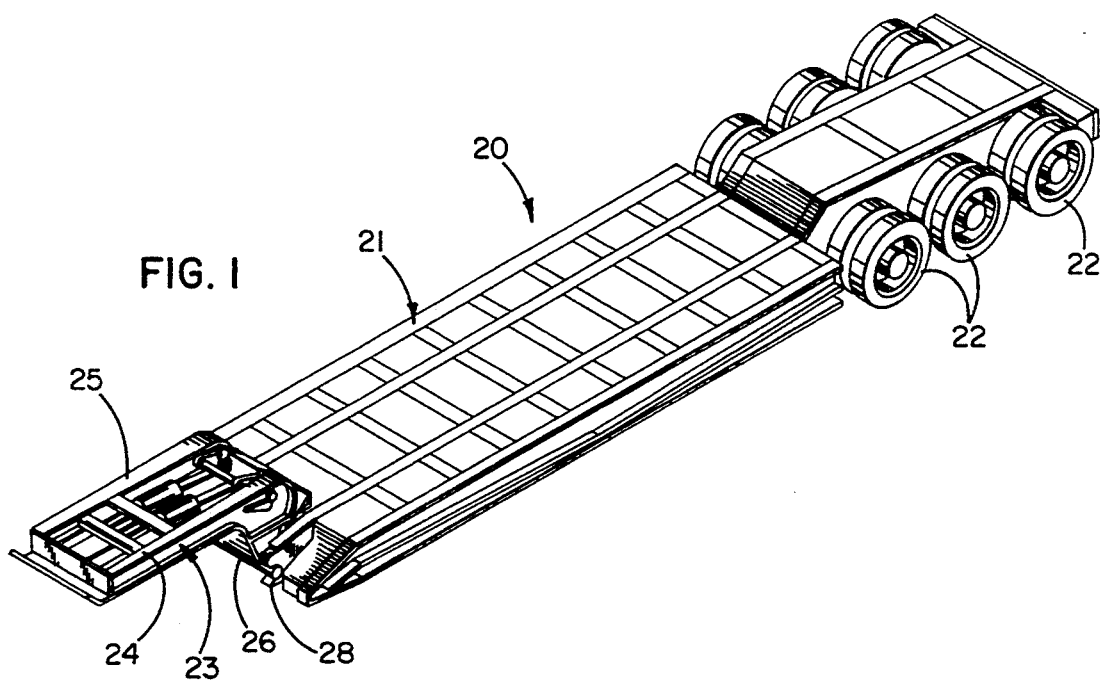
FIG. 1 is a perspective view of a new and improved trailer incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

Figure 4:
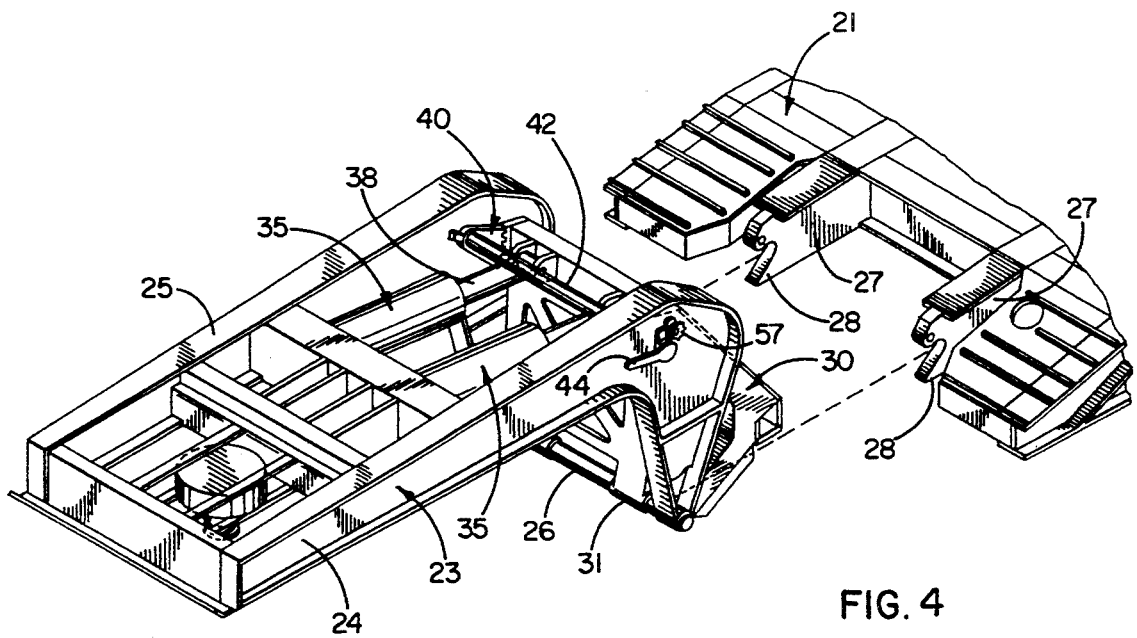
FIG. 4 is a perspective view showing the platform and the gooseneck in exploded relation.
Figure 5:
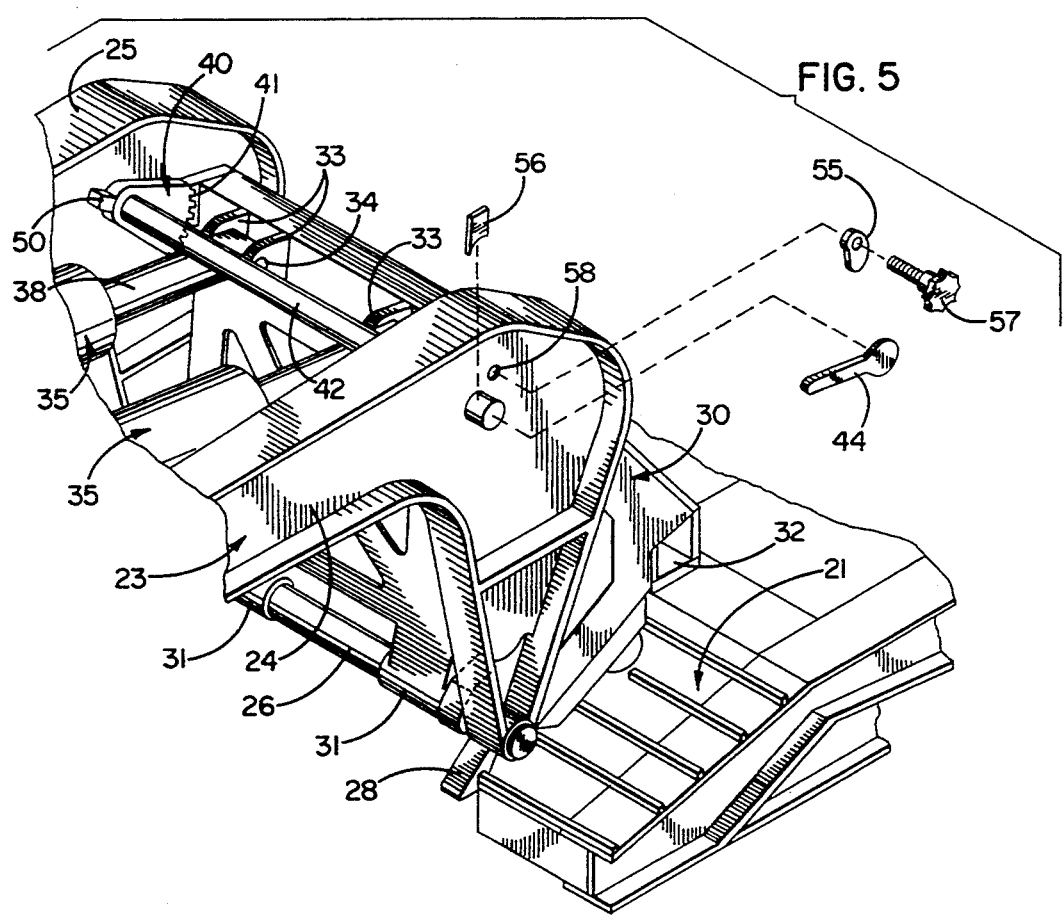
FIG. 5 is a perspective view showing certain components of the gooseneck in exploded relation.

For purposes of illustration, the invention has been shown in the drawings as incorporated in a trailer 20 having a substantially flat cargo-carrying platform 21 whose rear end portion is supported by gangs of wheels 22. Connected to the forward end portion of the platform is a so-called gooseneck hitch 23 which serves to connect the platform to the fifth wheel coupler (not shown) of a towing vehicle. The hitch is commonly referred to as a "gooseneck" because it first extends upwardly from the platform and then extends horizontally toward the towing vehicle. Thus, the gooseneck 23 includes an upwardly extending rear section and a forwardly extending front section defined by laterally spaced beams 24 and 25. A laterally extending and relatively large diameter shaft 26 (FIGS. 4 and 5) is connected rigidly to and spans the beams at the lower end of the rear section of the gooseneck.

The trailer platform 21 includes two laterally spaced beams 27 (FIG. 4) which carry forwardly and downwardly opening hooks 28 at their forward ends. The hooks 28 are adapted to hook around the shaft 26 between the beams 24 and 25 of the gooseneck 23, the hooks coacting with the shaft to define pivot means for the gooseneck. In order to keep the hooks in tight engagement with the shaft 26 and establish a towing connection between the gooseneck and the platform 21, the gooseneck is equipped with a pivoted link 30 which normally causes the shaft to bear upwardly against the hooks.

In this specific instance, the link 30 extends laterally between the beams 24 and 25, is generally triangular in shape and includes three corner portions. The first corner portion of the link is defined by sleeves 31 (FIG. 5) which are pivotally supported on the shaft 26 to rotate about the axis thereof. The second corner portion of the link is defined by a laterally extending foot 32 spaced rearwardly of the shaft 26 and adapted to bear downwardly against the upper side of the forward end portion of the platform 21. The third corner of the link is located above the shaft 26 and is defined in part by two laterally spaced pairs of laterally spaced ears 33, there being a pivot pin 34 extending through each pair of ears.

Figure 3:
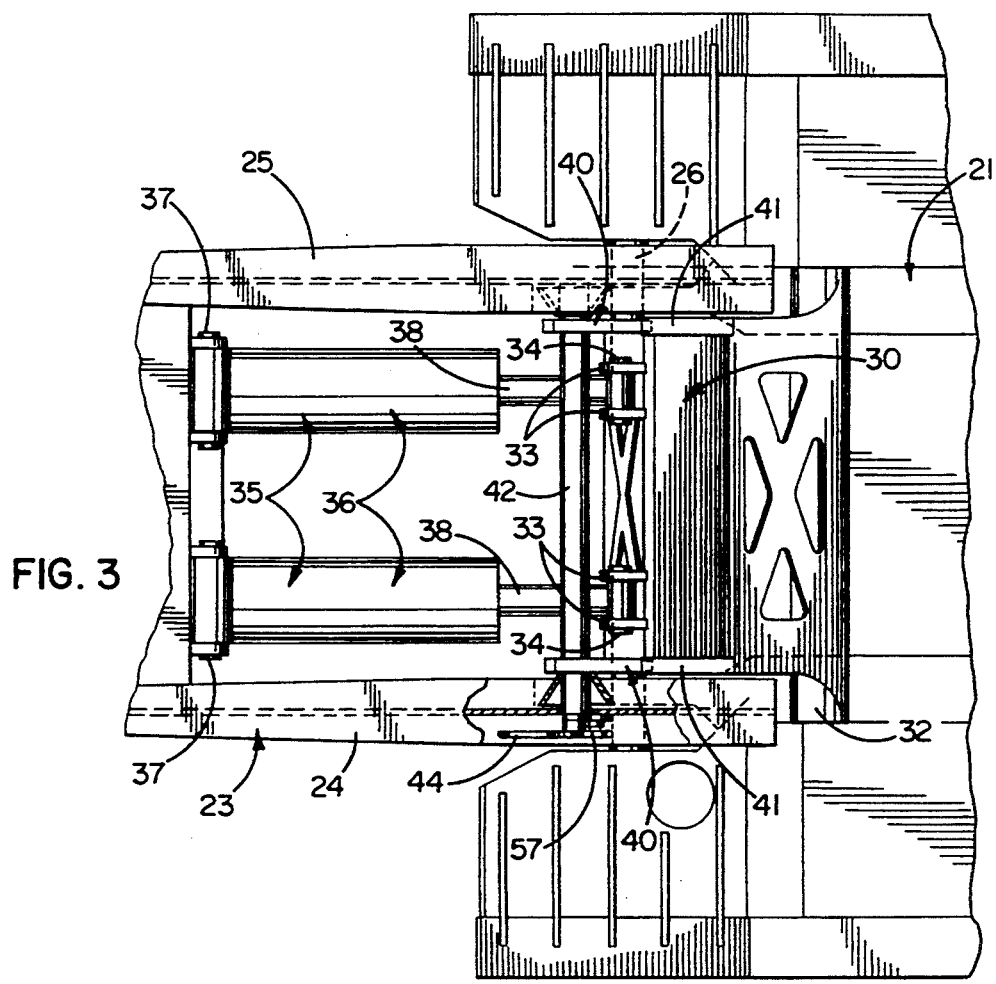
FIG. 3 is a fragmentary plan view as seen along the line 3—3 of FIG. 2.

Power-operated actuating means in the form of two laterally spaced and double-acting reciprocating hydraulic actuators 35 (FIG. 3) are located between the beams 24 and 25 of the gooseneck 23. The cylinders 36 of the actuators are pivotally connected to the gooseneck by pins 37 while the rods 38 of the actuators are pivotally connected to the ears 33 by the pins 34.

When the cylinders 36 are pressurized to extend the rods 38, the link 30 is rocked rearwardly or clockwise about the shaft 26 to force the foot 32 downwardly against the upper side of the forward end portion of the platform 21. This creates a force couple causing the shaft 26 to shift upwardly within the hooks 28 and to bear tightly against the hooks so as to establish the towing connection. With further extension of the rods, the shaft acts through the hooks to lift the forward end portion of the platform to a transport position spaced a predetermined distance above the ground.

When the rods are retracted, the link 30 is rocked forwardly or counterclockwise about the shaft 26. This allows the gooseneck 23 to rotate clockwise relative to the platform 21 which causes the rear end of the gooseneck and the forward end of the platform to lower, the forward end of the platform eventually reaching the ground and relieving the load between the hooks 28 and the shaft to enable the shaft to be pulled from the hooks for purposes of detaching the gooseneck 23 from the platform.

When the platform 21 is in its transport position (FIG. 6), it is advantageous to unload the actuators 35 by relieving the pressure in the cylinders 36. It is necessary, however, to keep the link 30 in a fixed position in order to maintain the force couple created by the foot 32 and the hooks 28. For this purpose, mechanical stop members 40 are carried by the gooseneck 23 and block the link against forward pivoting once the pressure in the cylinders 36 is relieved.

Figure 2:
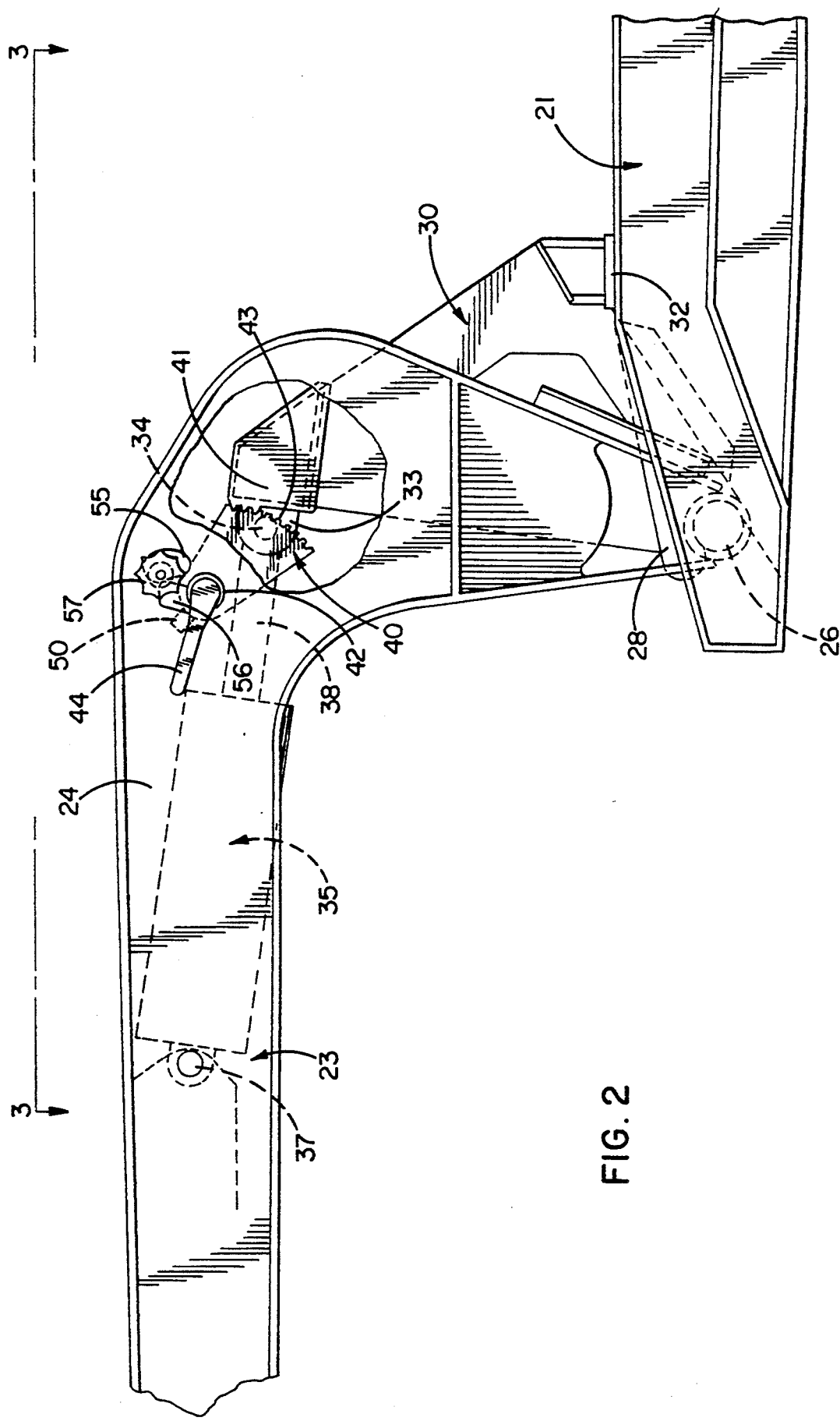
FIG. 2 is an enlarged fragmentary side elevational view of portions of the trailer.

In accordance with one aspect of the present invention, the mechanical stops 40 are in the form of toothed compression cams which coact with toothed members 41 at the third corner of the link 30 to block the link in a transport position which may be selectively adjusted to change the ride height of the forward end of the platform 21. As shown most clearly in FIGS. 2 and 3, a compression cam 40 is located adjacent the inboard side of each beam 24, 25 and each is in the form of a plate which is fixed to a shaft 42 extending between and supported rotatably by the beams. Each cam includes a cam face 43 (FIG. 2) which is curved non-arcuately about the axis of the shaft 42 and which is defined by a series of teeth, each cam face herein having ten teeth. A handle 44 (FIG. 5) is welded to the shaft 42 outboard of the beam 24 and enables the shaft to be turned manually in order to change the angular position of the cams.

The toothed members 41 also are in the form of laterally spaced plates rigidly fixed to the upper or third corner of the link 30 and having toothed edges disposed in opposing relation with the toothed cam faces 43 of the cams 40. In this instance, each toothed plate 41 includes three teeth.

Figure 6:
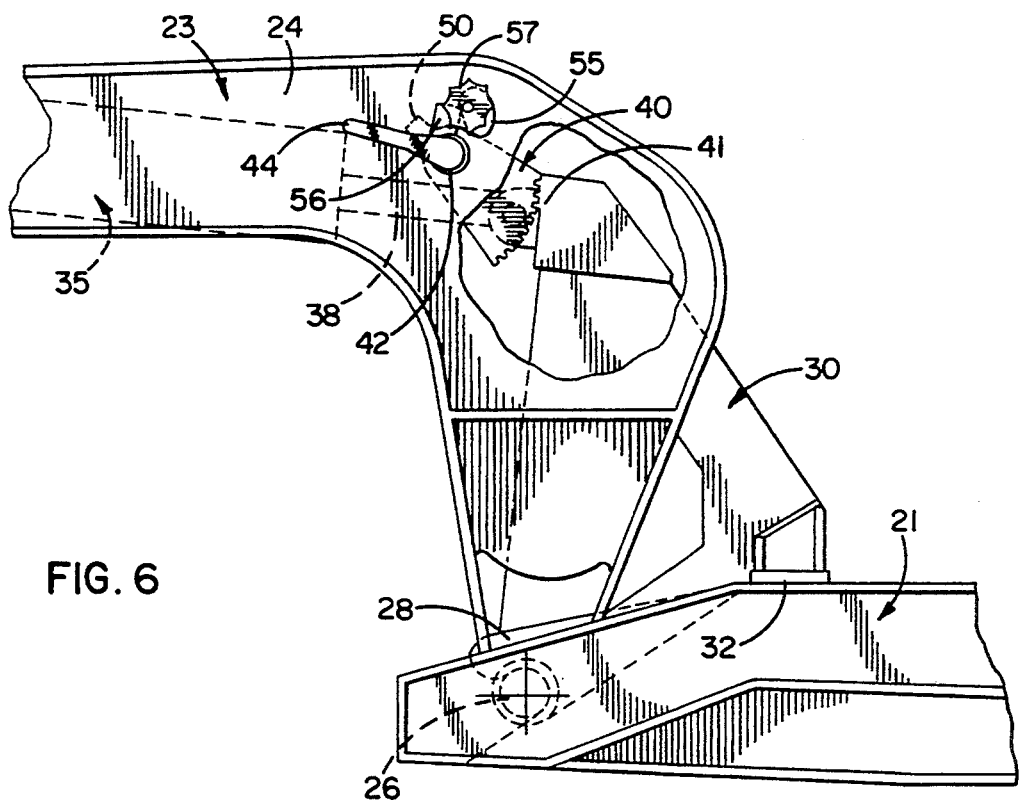
FIGS. 6–9 are reduced views generally similar to FIG. 2 and show successive steps of lowering the trailer platform to the ground.

FIG. 6 shows the cams 40 in a transport position which establishes the lowest normal ride height for the platform 21 when the trailer is being towed by a tractor having a relatively high fifth wheel coupler. When the cams are in this position, the three teeth of each plate 41 are engaged with the upper three teeth of the opposing cam. By releasing the toothed cams from the toothed plates in a manner to be described subsequently, by turning the cams counterclockwise and then by re-engaging the cams and the plates, the teeth of the plates engage lower teeth of the non-arcuate cam faces 43 and cause the link 30 to assume a more clockwise oriented position about the shaft 26 so as to raise the ride height of the forward end portion of the platform.

Figure 7:
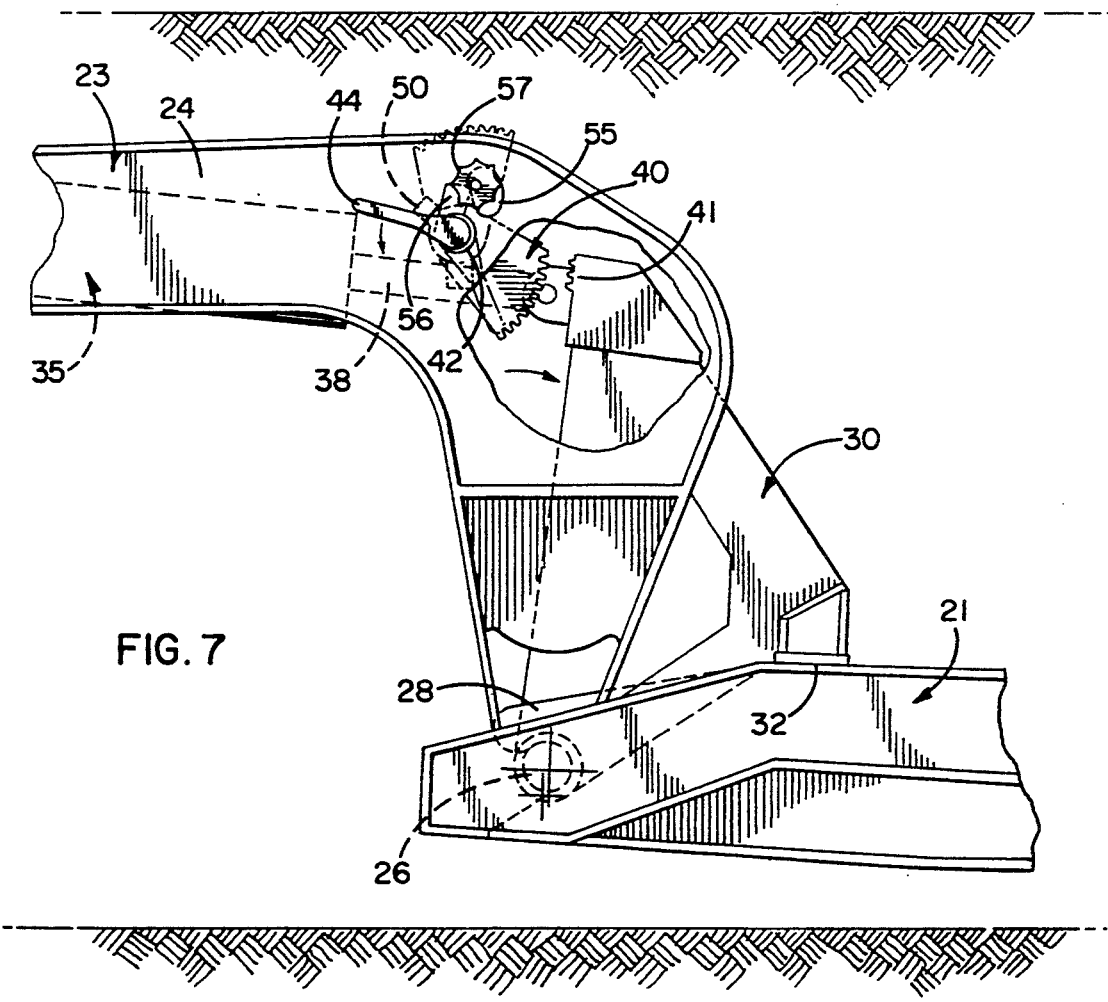

The manner of lowering the platform 21 to the ground and uncoupling the gooseneck 23 from the platform now will be explained. For purposes of such explanation, assume that the platform is held in its lowest normal transport position by the cams 40 with the cams being positioned angularly as shown in FIG. 6. To lower the forward end of the platform to the ground, the rods 38 of the actuators 35 first are extended slightly to rock the link 30 rearwardly and release the toothed plates 41 from the toothed cams 40 (see FIG. 7). The cams are then turned to an inactive and substantially vertical position as shown in phantom in FIG. 7 by manually rotating the shaft 42 counterclockwise with the handle 44. Thereafter, the link 30 is rocked forwardly by retracting the rods 38 of the actuators 35.

Figure 8:
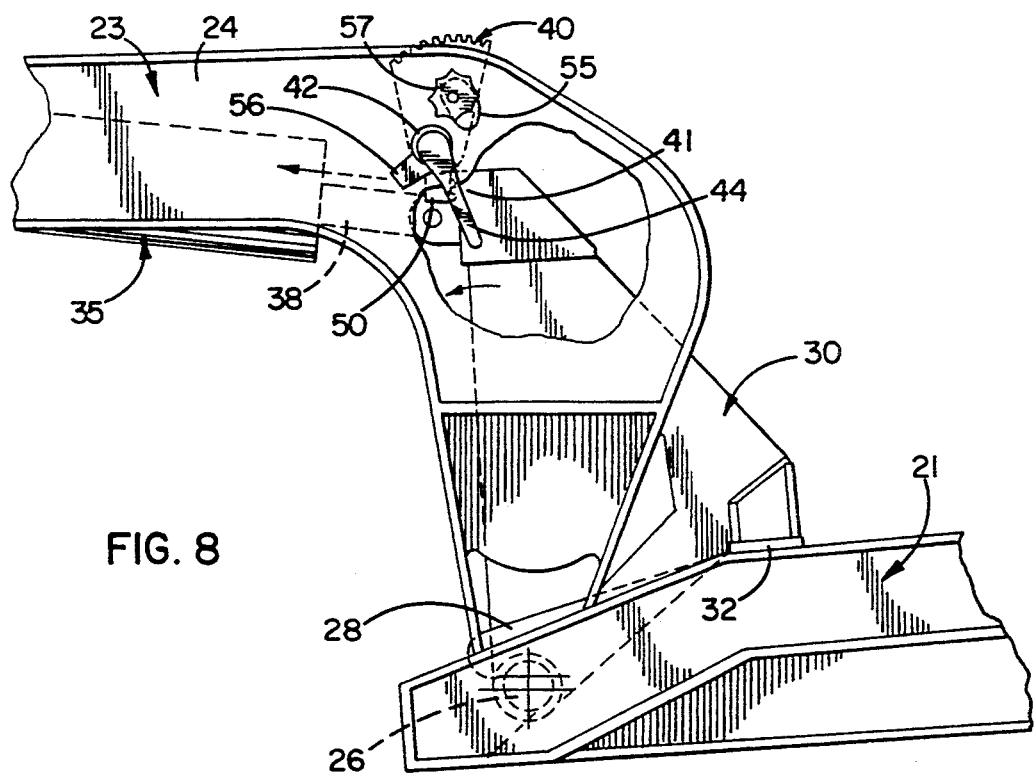
Figure 9:
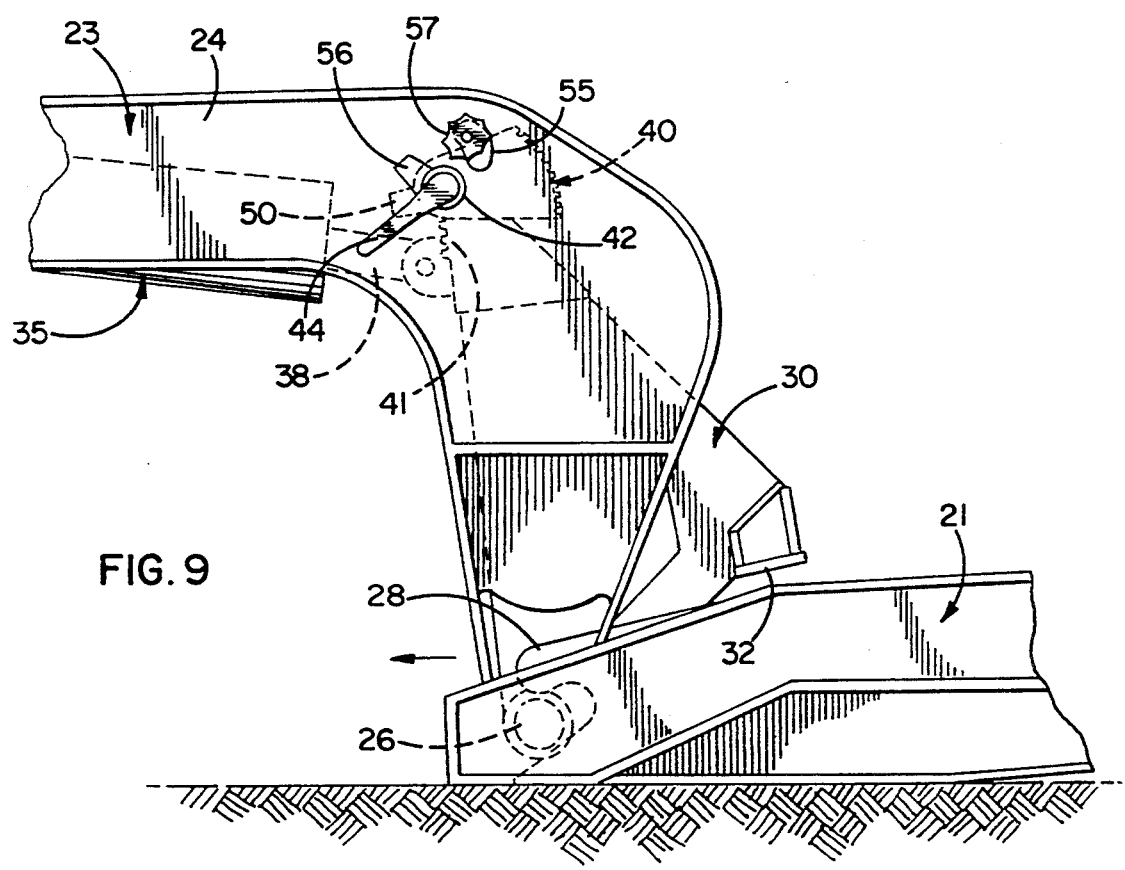

According to the invention, the cams 40, when in their inactive positions, are clear of the path followed by the forwardly rocked link 30 except for abutment means 50 on the end of each cam opposite the end with the cam face 43. Herein, each abutment means is in the form of a short lug which, when the cam is in its inactive position, projects downwardly into the path of the link 30 as shown in phantom in FIG. 7 and in full in FIG. 8. Thus, when the link is rocked forwardly by the actuators 35, the toothed plates 41 engage the lugs 50 and cause the shaft 42 to turn clockwise to locate the cams in a stored position (FIG. 9) in which the cams rest on the upper end of the link when the latter is rocked to a fully forward position. As the link approaches that position, the forward end of the platform reaches the ground and, with further forward rocking of the link, the shaft 26 lowers downwardly from the hooks 28. After a safety latch (not shown) has been released, the towing vehicle may be driven forwardly to pull the gooseneck 23 away from the platform 21. The platform thus may be loaded or unloaded without interference from the gooseneck. During the time the gooseneck is detached from the platform, the cams 40 remain in their stored position resting on the link 30 as shown in FIG. 9.

Re-installation of the gooseneck 23 on the platform 21 is effected by backing the gooseneck toward the platform until the shaft 26 enters the hooks 28. Thereafter, the rods 38 of the actuators 35 are extended to rock the link 30 rearwardly and cause the shaft 26 to raise upwardly into the hooks. As the link is rocked rearwardly, it moves from beneath the cams 40 and, due to gravity, the cams turn clockwise toward the transport position of FIG. 6. The cams reach that position as soon as the toothed plates 41 clear the cams. Thereafter, the rods 38 are retracted to bring the plates into locking engagement with the toothed cam faces 43 of the cams and complete the re-installation of the gooseneck 23.

Accordingly, the trailer operator need not manually actuate the cams 40 during re-installation of the gooseneck 23. Moreover, means are provided for stopping the cams in a selected one of a plurality of angular positions when the link 30 clears the cams and gravity causes the cams to swing downwardly. Herein, these means comprise an adjustable cam 55 (FIG. 5) which coacts with an ear 56 affixed to and projecting radially from the shaft 42 outboard of the web of the beam 24. The cam is carried on the shank of a locking screw 57 which is threaded into a hole 58 in the web of the beam 24 and which normally clamps the cam in a fixed angular position. When the shaft 42 rotates clockwise to a position in which the lug 56 strikes the cam 55, further rotation of the shaft is stopped and thus the cams 40 drop to and are held in a preselected position. By loosening the screw 57 and turning the cam 55, the angular position in which the shaft and the cams 40 is stopped may be adjusted so as to change the normal ride height of the platform. For example, by turning the cam 55 counter-clockwise from the position shown in FIG. 6, the cams 40 are stopped in a higher position and cause the platform to be disposed at a higher ride height.

From the foregoing, it will be apparent that the present invention brings to the art a new and improved trailer 10 in which the toothed cams 40 coact with the toothed plates 41 of the link 30 to enable the ride height of the platform 21 to be changed while positively locking the link to the cams. When the gooseneck 23 is re-installed, the cams 40 are automatically reset to their previously adjusted positions and thus the trailer operator need not manually actuate the cams during the re-installation process.

We claim:

1. A trailer having a wheeled platform with a forward end portion and having a gooseneck for connecting said platform to a towing vehicle, laterally extending pivot means on said gooseneck and connecting the forward end portion of said platform to said gooseneck, said gooseneck including a link having a first portion supported to swing about said pivot means, having a second portion located rearwardly of said pivot means and normally bearing against said platform, and having a third portion located above said pivot means and forwardly of said second portion, a stop member movably supported by said gooseneck and normally disposed in a selected one of a plurality of transport positions, said third portion of said link normally bearing against said stop member whereby said stop member normally prevents said link from rotating forwardly about said pivot means, power-operated actuator means connected to said link and selectively operable to rock said third portion of said link rearwardly out of engagement with said stop member, means for moving said stop member from said selected transport position to an inactive position after said third portion of said link has been rocked rearwardly out of engagement with said stop member, said stop member, when in said inactive position, freeing said link for forward rocking about said pivot means to a predetermined position, said actuator means being operable to rock said link forwardly to said predetermined position after said stop member has been moved to said inactive position, said actuator means subsequently being operable to rock said link rearwardly from said predetermined position, and said stop member being responsive to rearward rocking of said link from said predetermined position and returning automatically to the selected transport position after said link has been rocked rearwardly a predetermined distance from said predetermined position.

2. A trailer as defined in claim 1 in which said stop member is supported on said gooseneck to turn about a laterally extending axis, said moving means comprising manually operable means for turning said stop member about said axis from said selected transport position to said inactive position after said third portion of said link has been rocked rearwardly out of engagement with said stop member, abutment means on said stop member and disposed in the path of said link when said stop member is in said inactive position and as said link is rocked forwardly, said link engaging said abutment means during forward rocking of said link and pivoting said stop member to a stored position located between said transport position and said inactive position, said stop member resting on said link when said stop member is in said stored position and said link is in said predetermined position, said stop member pivoting downwardly about said axis and toward said transport position by gravity as said link is rocked rearwardly from said predetermined position and moves from beneath said stop member, and means for stopping said stop member against downward pivoting when said stop member reaches said selected transport position.

3. A trailer as defined in claim 1 in which said stop member is a cam having a cam face curved non-arcuately about said axis, said cam face being toothed, and said third portion of said link also being toothed and engaging some but not all of the teeth of said cam face when said cam is in said selected transport position.

4. A trailer as defined in claim 3 in which said third portion of said link engages certain teeth of said cam face when said cam is in one selected transport position and engages additional teeth of said cam face when said cam is in a different selected transport position.

5. A trailer having a wheeled platform with a forward end portion and having a gooseneck for connecting said platform to a towing vehicle, laterally extending pivot means on said gooseneck and coupling the forward end portion of said platform to said gooseneck, said gooseneck including a link having a first portion supported to swing about said pivot means, having a second portion located rearwardly of said pivot means and normally bearing against said platform, and having a toothed portion located above said pivot means and forwardly of said second portion, a compression cam rotatably supported by said gooseneck to turn about a laterally extending axis and normally disposed in a predetermined transport position relative to said axis, said cam having a toothed cam face curved non-arcuately about said axis and normally engaged with said toothed portion of said link to prevent said link from rotating forwardly about said pivot means, power-operated actuator means connected to said link and selectively operable to rock said link rearwardly about said pivot means to release said toothed portion of said link from said cam face, means for manually turning said cam to an inactive position about said axis after said toothed portion has been released from said cam face, said actuator means thereafter being selectively operable to rock said link forwardly to a predetermined position, abutment means on said cam and disposed in the path of said link when said cam is in said inactive position and as said link is rocked forwardly, said link engaging said abutment means during forward rocking of said link and pivoting said cam about said axis to a stored position in which said cam rests on said link when said link is in said predetermined position, said actuator means being selectively operable to rock said link rearwardly from said predetermined position to cause said link to move from beneath said cam and to allow said cam to pivot downwardly about said axis to said transport position, and means for stopping downward pivoting of said cam when said cam reaches said transport position.

6. A trailer as defined in claim 5 further including means for adjusting said stopping means in order to change the predetermined transport position of said cam.

7. A trailer having a wheeled platform with a forward end portion and having a gooseneck for connecting said platform to a towing vehicle, laterally extending pivot means on said gooseneck and coupling the forward end portion of said platform to said gooseneck, said gooseneck including a link having a first portion supported to swing about said pivot means, having a second portion located rearwardly of said pivot means and normally bearing against said platform, and having a toothed portion located above said pivot means and forwardly of said second portion, a compression cam rotatably supported by said gooseneck to turn about a laterally extending axis and normally disposed in a predetermined transport position relative to said axis, said cam having a toothed cam face curved non-arcuately about said axis and normally engaged with said toothed portion of said link to prevent said link from rotating forwardly about said pivot means, power-operated actuator means connected to said link and selectively operable to rock said link rearwardly about said pivot means to release said toothed portion of said link from said cam face, and means for turning said cam to an inactive position about said axis after said toothed portion has been released from said cam face, said actuator means thereafter being selectively operable to rock said link forwardly to a predetermined position.

* * * * *